(12) United States Patent
Bernard et al.

(10) Patent No.: US 11,761,562 B2
(45) Date of Patent: Sep. 19, 2023

(54) FIBRE REINFORCED POLYMER COMPOSITE PIPES

(71) Applicant: Crompton Technology Group Ltd., West Midlands (GB)

(72) Inventors: James Bernard, Oxfordshire (GB); Paul Daniel Liddel, Oxfordshire (GB); Jon Pethick, Leicestershire (GB)

(73) Assignee: CROMPTON TECHNOLOGY GROUP LIMITED, Oxfordshire (GB)

( * ) Notice: Subject to any disclaimer, the term of this patent is extended or adjusted under 35 U.S.C. 154(b) by 768 days.

(21) Appl. No.: 16/721,211

(22) Filed: Dec. 19, 2019

(65) Prior Publication Data

US 2021/0102646 A1    Apr. 8, 2021

(30) Foreign Application Priority Data

Oct. 7, 2019   (EP) .................................. 19275091

(51) Int. Cl.
*F16L 9/12*   (2006.01)
*B29C 45/14*  (2006.01)
(Continued)

(52) U.S. Cl.
CPC ........ *F16L 9/125* (2013.01); *B29C 45/14631* (2013.01); *D01F 9/12* (2013.01);
(Continued)

(58) Field of Classification Search
CPC . B29C 45/14631; B29C 70/48; B29C 70/386; B29C 48/09; B29C 48/21;
(Continued)

(56) References Cited

U.S. PATENT DOCUMENTS

| 3,651,661 A | 3/1972 | Darrow |
| 3,920,049 A | 11/1975 | Lippert et al. |

(Continued)

FOREIGN PATENT DOCUMENTS

| CN | 104260373 A | 1/2015 |
| CN | 106828616 A | 6/2017 |

(Continued)

OTHER PUBLICATIONS

European Search Report for Application No. 18275117.2, dated Feb. 27, 2019, 13 pages.

(Continued)

*Primary Examiner* — Camie S Thompson
(74) *Attorney, Agent, or Firm* — CANTOR COLBURN LLP (57) ABSTRACT

A fiber reinforced polymer composite pipe includes first and second ends and defines a central axis running in a longitudinal direction from the first end to the second end, and the pipe including at least one non-linear portion along the central axis between the first end and the second end. A first material extends continuously from the first end to the second end, the first material being a fiber reinforced polymer material comprising fiber reinforcement in a polymer matrix and having an electrical resistivity determined by an electrically conductive fiber reinforcement and/or an electrically conductive additive in the polymer matrix; and a second material arranged at the at least one non-linear portion and extending discontinuously between the first end and the second end, and has an elastic modulus greater than the elastic modulus of the first material in the longitudinal direction.

15 Claims, 8 Drawing Sheets

(51) Int. Cl.
*D01F 9/12* (2006.01)
*B29K 307/04* (2006.01)
*B29L 23/00* (2006.01)

(52) U.S. Cl.
CPC ....... *B29K 2307/04* (2013.01); *B29L 2023/22* (2013.01); *D10B 2101/12* (2013.01); *D10B 2505/02* (2013.01)

(58) Field of Classification Search
CPC ............ B29C 48/0019; B29K 2307/04; B29L 2023/00; B29L 2023/04; B29L 2023/22; D01F 9/12; D10B 2101/12; D10B 2505/02; F16L 43/008; F16L 9/125; F16L 9/128; F16L 9/14; F16L 1/18; F16L 1/19; F16L 43/08; F16L 11/00; F16L 11/02; F16L 11/08; F16L 11/081; F16L 11/082; F17C 1/16; F17C 2201/0119; F17C 2203/066; F17C 2203/0663
USPC ..... 428/297.4, 299.1, 298.1, 299.4; 138/174, 138/153, 144, 145
See application file for complete search history.

(56) References Cited

U.S. PATENT DOCUMENTS

| | | | |
|---|---|---|---|
| 4,256,790 A | 3/1981 | Lackman et al. | |
| 4,511,423 A | 4/1985 | Magarian et al. | |
| 4,622,091 A | 11/1986 | Letterman | |
| 4,813,457 A | 3/1989 | Offringa et al. | |
| 4,980,006 A | 12/1990 | Bordner | |
| 5,110,644 A | 5/1992 | Sparks et al. | |
| 5,135,596 A | 8/1992 | Pabsch et al. | |
| 5,397,272 A | 3/1995 | Smiley et al. | |
| 5,685,933 A | 11/1997 | Ohta et al. | |
| 7,138,167 B2 | 11/2006 | Sakonjo et al. | |
| 7,943,073 B2 | 5/2011 | Simmons et al. | |
| 8,491,740 B2 | 7/2013 | Serey et al. | |
| 8,800,605 B2 | 8/2014 | Barlow et al. | |
| 8,813,335 B2 | 8/2014 | Geislinger et al. | |
| 9,140,140 B2 | 9/2015 | McMillan | |
| 9,222,605 B2 | 12/2015 | Ciolczyk et al. | |
| 9,482,266 B2 | 11/2016 | Dewhirst | |
| 9,731,453 B2 | 8/2017 | Humfeld et al. | |
| 9,863,558 B2 | 1/2018 | Rooke et al. | |
| 9,897,122 B2 | 2/2018 | Luce | |
| 9,908,634 B2 | 3/2018 | Shome | |
| 9,937,671 B2 | 4/2018 | Larson | |
| 2013/0236664 A1 | 9/2013 | Tsotsis | |
| 2013/0266431 A1 | 10/2013 | Moram et al. | |
| 2015/0129119 A1 | 5/2015 | Askan | |
| 2015/0176732 A1 | 6/2015 | Courpet et al. | |
| 2015/0299913 A1 | 10/2015 | Hori et al. | |
| 2016/0257079 A1 | 9/2016 | Taneda et al. | |
| 2016/0273696 A1 | 9/2016 | Gonzalez Bayon et al. | |
| 2017/0198734 A1 | 7/2017 | Bernard et al. | |
| 2018/0222167 A1 | 8/2018 | Yamada et al. | |
| 2019/0113158 A1* | 4/2019 | Zhou ..................... F16L 11/081 |

FOREIGN PATENT DOCUMENTS

| | | |
|---|---|---|
| DE | 19906618 A1 | 8/2000 |
| DE | 102011077287 A1 | 12/2012 |
| DE | 102014004157 A1 | 9/2015 |
| EP | 1859958 B1 | 9/2010 |
| EP | 3332946 A1 | 6/2018 |
| FR | 2706574 A1 | 12/1994 |
| GB | 1222041 A | 2/1971 |
| GB | 2033992 A | 5/1980 |
| GB | 2082730 A | 3/1982 |
| GB | 2552170 A | 1/2018 |
| JP | 2875865 B2 | 3/1999 |
| JP | 03276221 B2 | 4/2002 |
| JP | 2013044358 A | 3/2013 |
| JP | 2017007289 A | 1/2017 |
| WO | 2009087372 A1 | 7/2009 |
| WO | 2010092979 A1 | 8/2010 |
| WO | 2011039828 A1 | 4/2011 |
| WO | 2017123399 A1 | 7/2017 |
| WO | 2018094339 A1 | 5/2018 |

OTHER PUBLICATIONS

European Search Report for Application No. 19275091.7, dated Feb. 25, 2020, 8 pages.
European Search Report for Application No. 18275115.6 dated Jan. 23, 2019; 10 pgs.
European Search Report for Application No. 18275118.0 dated Feb. 26, 2019; 10 pgs.
European Search Report for Application No. 18386023.8 dated Feb. 27, 2019; 8 pgs.
European Search Report for Application No. 18386024.6 dated Feb. 27, 2019; 13 pgs.
European Search Report for Application No. 18386025.3 dated Feb. 28, 2019; 14 pgs.

* cited by examiner

FIBRE REINFORCED POLYMER COMPOSITE PIPES

FOREIGN PRIORITY

This application claims priority to European Patent Application No. 19275091.7 filed Oct. 7, 2019, the entire contents of which is incorporated herein by reference.

TECHNICAL FIELD

The present disclosure relates to composite (e.g. fiber-reinforced polymer) pipes and in particular to pipes having at least one non-linear portion or more complex geometries.

BACKGROUND

Composite materials, such as fiber-reinforced polymers, are used in a wide variety of applications where parts with high strength but low mass are required. For example, carbon or glass fiber-reinforced polymer (FRP) composite materials are often used to produce structural components (e.g. struts, connectors), force-transmitting components (e.g. drive shafts, push rods) and fluid transfer conduits (e.g. fuel pipes) in the aerospace and automotive industries. Components suitable for these applications must have high strength to handle the large forces involved, but also need to minimise weight for fuel saving and/or performance reasons.

Modern composite winged aircraft do not provide adequate protection to the fuel system from lightning strikes. The fuel pipes in the fuel system must have a low enough electrical conductivity to prevent electrical discharge from a lightning strike but sufficient electrical conductivity to prevent static electrical build-up. It is known to tailor the electrical conductivity of composite fuel pipes by mixing a dispersion of electrically conductive particulate filler into a glass reinforced polymer material, for example as disclosed in WO 2009/087372.

In addition to electrical conductivity properties, it remains a challenge to form composite pipes that also have sufficient stiffness to withstand pressurised flow for a range of pipe geometries. It would be desirable that fuel pipes, for example, are not constrained to a linear shape. However, complex geometries introduce extra demands as there may be a tendency for a pressurised pipe to deform at any bends. Deflections in a composite pipe can cause the pipe to come loose from its end connectors.

There remains a need for improvements in composite pipes.

SUMMARY

According to the present disclosure, there is provided a fiber reinforced polymer composite pipe, The pipe includes: a first end and a second end, the pipe defining a central axis running in a longitudinal direction from the first end to the second end, and the pipe including at least one non-linear portion along the central axis between the first end and the second end. A first material extends continuously from the first end to the second end, the first material being a fiber reinforced polymer material comprising fiber reinforcement in a polymer matrix and having an electrical resistivity determined by an electrically conductive fiber reinforcement and/or an electrically conductive additive in the polymer matrix. A second material arranged at the at least one non-linear portion and extending discontinuously between the first end and the second end, the second material being a carbon fiber reinforced polymer material comprising carbon fiber reinforcement in a polymer matrix and having an elastic modulus provided by the carbon fiber reinforcement. The elastic modulus of the second material is greater than the elastic modulus of the first material in the longitudinal direction.

Composite pipes in accordance with this disclosure do not run straight along the central axis as they include at least one non-linear portion (such as a bend) between the first end and the second end. In other words, such pipes run in a non-constant axial direction. In some examples, the second end may be offset from the first end as a result of the at least one non-linear portion. In some examples, the first end and the second end may be co-linear but with one or more non-linear portions between them, e.g. forming a pipe that has a complex shape rather than being straight.

It will be appreciated that composite pipes in accordance with this disclosure have the first material extending continuously from end to end, which means that the overall electrical conduction path always includes the first material. The second material provides a greater axial stiffness as a result of its carbon fiber reinforcement, which might otherwise provide an electrical conductivity higher than desired. However, as the second material does not extend continuously from end to end, the overall electrical conductivity of the pipe can be tailored by the first material. For example, the electrical resistivity of the first material may be designed to compensate for excessive conductivity resulting from the carbon fiber reinforcement in the second material. Meanwhile, the second material beneficially provides increased axial stiffness for the non-linear portion(s) that are most susceptible to deformation. As both the first and second materials are electrically conductive, there are no discontinuities in the electrical conduction path along the pipe. The pipe's end-to-end conductivity requirements, as well as wall thickness requirements, can be met by suitable tailoring of the first material.

In some examples, the first material has an electrical resistivity at least partially determined by an electrically conductive fiber reinforcement. For example, the electrically conductive fiber reinforcement may comprise chopped carbon fiber. In such examples, the polymer matrix may be a thermoplastic, e.g. polyether ether ketone—"PEEK".

In at least some examples, the first material is a fiber reinforced polymer material comprising chopped carbon fiber reinforcement in the polymer matrix, and having an electrical resistivity at least partially determined by the chopped carbon fiber reinforcement. In such examples, the chopped carbon fiber reinforcement may be present in the first material in an amount of between 5% and 15% of the material by weight or volume.

Where a lower conductivity fiber may be required, e.g. to compensate for the second material, the fiber reinforcement may comprise glass fibers, polymeric (e.g. aramid) fibers, and/or alumina silica. Such electrically non-conductive fiber reinforcement may be mixed with chopped carbon fibers in some examples. In addition, or alternatively, the non-conductive fiber reinforcement may comprise one or more continuous fibers.

In at least some examples, in addition or alternatively, the first material is a fiber reinforced polymer material comprising an electrically non-conductive fiber reinforcement in the polymer matrix, and having an electrical resistivity at least partially determined by an electrically conductive additive in the polymer matrix.

The electrically conductive additive can be incorporated into the first material in varying amounts to achieve the desired electrical resistivity for a particular application. As mentioned above, a suitable electrically non-conductive fiber reinforcement may include one or more of: glass fibers, polymeric (e.g. aramid) fibers, or alumina silica fibers. In such examples, the polymer matrix may be a thermoset, e.g. epoxy resin.

In at least some examples, the electrically conductive additive is chosen from one or more of: carbon black, graphene, carbon nanotubes, and conductive metal oxide particles. For example, conductive metal oxide particles may be made of antimony tin oxide (ATO) or indium tin oxide (ITO).

In examples in which the conductive additive comprises carbon black, the carbon black may be present in the first material in an amount of between 1% and 5% of the material by weight or volume.

In examples in which the conductive additive comprises carbon nanotubes, the carbon nanotubes may be present in the first material in an amount of between about 0.1% and 0.8% of the material by weight or volume, for example about 0.5% by weight or volume.

In at least some examples, the electrically conductive additive is present in the polymer matrix in an amount up to 40%, 30%, 20%, 10%, 5%, 2%, 1% or 0.5% of the polymer matrix by weight or volume.

The composition of the first material may be tailored to provide a desired level of electrical conductivity, for example as generally described in WO 2009/087372, the contents of which are hereby incorporated by reference. The electrical conductivity or resistivity of the first material may be chosen to ensure that the composite pipe has a desired level of resistance per unit length, e.g. taking into account the thickness of the pipe. The overall resistance per unit length of the composite pipe may be specified for a particular application or environment.

In at least some examples, the first material has an electrical resistivity selected such that the composite pipe has an overall resistance per unit length of between 50 kΩ per meter and 4 MΩ per meter, and preferably between 150 kΩ per meter and 1.4 MΩ per meter.

In at least some examples, the first material has an electrical resistivity selected such that the composite pipe has an overall resistance per unit length of less than 1.25 MΩ per meter.

The main purpose of the first material is to meet the pipe's end-to-end electrical conductivity requirements. The first material may be closer to an inner surface or an outer surface of the pipe. The first material may be sandwiched between layers of the second material at those locations where the second material is present.

In at least some examples, the first material takes the form of an inner pipe or an outer pipe.

The overall end-to-end electrical conductivity of the pipe may be affected by the wall thickness of the pipe. A minimum wall thickness may be stipulated, e.g. for pressurised applications such as fuel pipes. The thickness of either the first material and/or the second material may be adjusted as appropriate to meet wall thickness requirements. In at least some examples, the composite pipe has wall thickness in the range of 1-10 mm.

In at least some examples, the first material is formed by automated fiber placement (AFP). In such examples, the polymer matrix may be a thermoplastic material.

In at least some examples, the first material is formed by filament winding of the fiber reinforcement, for example by winding continuous fibers at low angles relative to the central axis of the pipe. In such examples, the polymer matrix may be a thermoplastic material.

While various conventional manufacturing techniques for fiber-reinforced polymer composites may be employed to make composite pipes according to the present disclosure, it has been recognised that some techniques may be better suited than others for making non-straight pipes and more complex pipe geometries.

In at least some examples, the first material is formed by resin transfer molding (RTM) using a braided preform for the fiber reinforcement. In such examples, the polymer matrix may be a thermoset material.

When penetrating through a mesh of fibers, the fibers may act to filter out the carbon black or other conductive additive in the polymer matrix material. This is not desirable as the conductive characteristics of the first material may be caused to vary over the length of the pipe depending on the percentage of additive filtered out. Using RTM methods, described further below, the filtration effect of the fibers is minimised as the resin is distributed over the longitudinal extent of the mold before radially penetrating the fibers. This effect can be optimised by injecting the resin into the mold under pressure and/or by applying a vacuum to the mold.

As is described below, in at least some examples it may be efficient to form both the first material and the second material in a single RTM process. A braided preform may be used for the fiber reinforcement of the first and/or second material. Such constructions can result in the composite pipe having an improved impact performance, for example as compared to a composite material made by filament winding.

As the second material does not extend continuously between the first and second ends of the pipe, its carbon fiber reinforcement can be tailored to provide a desired elastic modulus without concerns about excessive electrical conductivity.

In at least some examples, the second material is a carbon fiber reinforced polymer material comprising continuous carbon fiber reinforcement in a polymer matrix. Continuous fiber reinforcement can make the second material stiffer than discontinuous or chopped fibers.

The polymer matrix of the second material may be a thermoplastic or a thermoset. This may depend on the technique(s) used to apply the second material, as is discussed further below.

In some examples, the second material could possibly be formed by filament winding of the carbon fiber reinforcement, for example by winding continuous carbon fibers at low angles relative to the central axis of the pipe. However, filament winding is usually limited to a minimum angle of about 30 degrees relative to the central axis of the pipe.

In other examples, techniques are used to achieve angles of 30 degree or less relative to the central axis of the pipe. In particular, arranging at least some of the carbon fiber reinforcement at 0 degrees, i.e. axial fibers, greatly improves the axial stiffness and strength.

It may be preferable that at least some of the continuous carbon fiber reinforcement extends at an angle of between −30 degrees and +30 degrees relative to the central axis of the pipe. In at least some examples, substantially all of the continuous carbon fiber reinforcement extends at an angle of between −30 degrees and +30 degrees relative to the central axis of the pipe.

It may be preferable that at least some of the continuous carbon fiber reinforcement extends at an angle of between −5 degrees and +5 degrees relative to the central axis of the pipe. In at least some examples, substantially all of the continuous carbon fiber reinforcement extends at an angle of between −5 degrees and +5 degrees relative to the central axis of the pipe.

It may be preferable that at least some of the continuous carbon fiber reinforcement extends at an angle of about 0 degrees relative to the central axis of the pipe.

For example, the second material may be formed by placing pre-woven carbon fibers including at least some axial fibers at 0 degrees.

In at least some examples, the second material is a carbon fiber reinforced polymer material formed by automated fiber placement (AFP). In such examples, the polymer matrix may be a thermoplastic.

A preferred technique is to braid the continuous carbon fiber reinforcement so as to achieve one or more desired fiber angles and use resin transfer molding to set the fiber preform in a thermoset matrix (such as epoxy resin). Thus, in at least some examples, the second material is a carbon fiber reinforced polymer material formed by resin transfer molding (RTM).

The carbon fiber preform may take the form of a triaxial braid. A triaxially braided tube may comprise three sets of fibers braided or plaited together to make a pre-form sock as is known in the art of composite materials.

In at least some examples, the continuous carbon fiber reinforcement is formed by a triaxially braided tube comprising a first group of continuous carbon fibers extending substantially along the central axis of the pipe, a second group of continuous carbon fibers extending at an angle of +50-85 degrees (e.g. about +75 degrees) relative to the central axis of the pipe, and a third group of continuous carbon fibers extending at an angle of −50-85 degrees (e.g. about −75 degrees) relative to the central axis of the pipe. The second and third group of continuous carbon fibers can contribute to both axial strength and hoop strength.

In such examples, the first, second and third groups of fibers may be interwoven to form the triaxially braided tube. In any example of the disclosure, the first group of fibers could extend at an angle of between −10 and 10 degrees, or more preferably between −5 and 5 degrees relative to the central axis of the pipe. In any example of the disclosure, the second group of fibers could extend at an angle of between 60 and 90 degrees relative to the central axis of the pipe. In any example of the disclosure, the third group of fibers could extend at an angle of between −60 and −90 degrees (300 and 270 degrees) relative to the central axis of the pipe. Using current braiding machines, it is not normally efficient to braid the second and third groups of fibers at an angle of more than +/−85 degrees or more than +/−75 degrees relative to the central axis of the pipe.

It will be appreciated that the relative quantities and angles of the first, second and third groups of fibers in the triaxially braided tube can be varied to meet the design requirements of a particular tube.

In some examples, the triaxially braided tube may be pre-formed and then slid over the radially outer surface of a pipe made from the first material. Alternatively, the triaxially braided tube may be formed by braiding directly around the radially outer surface of a pipe made from the first material.

In some examples, the triaxially braided tube may be pre-formed and then slid over a former to set the second material at desired positions along a pipe before the first material is formed over the top.

In other examples, the continuous carbon fiber reinforcement may be formed by a biaxially woven fabric or mesh comprising a first group of carbon fibers extending at about 0 degrees (i.e. substantially parallel to the central axis of the pipe) and interwoven with a second groups of carbon fibers extending at about 90 degrees (i.e. substantially perpendicular to the central axis of the pipe).

In any example of the disclosure, if necessary to increase the strength of the second material against radial loads as well, additional carbon fibers may be circumferentially wound over the triaxially braided tube or the biaxially woven fabric. This may be most beneficial when used with a triaxially braided material in which there are no fibers extending perpendicular or at about 90 degrees to the central axis of the pipe.

After the required arrangement of carbon fibers (for example, comprising the triaxially braided tube described above) has been placed into position, the polymer matrix e.g. resin is then added to form the second material. In any example of the disclosure, a RTM technique may be used. A two-part mold is placed around the pre-form and underlying pipe or former. The mold is then clamped shut and a vacuum is applied while a resin such as epoxy resin is injected under pressure into the mold. The combination of injection under pressure and the applied vacuum draws the resin through the mold to penetrate radially into the carbon fibers.

In any example of the disclosure, quick or snap cure resins may be used to reduce the time required for curing the resin in the second material.

Heat is then applied to the mold to cure the resin. This causes the fiber arrangement and the resin to set into a solid reinforced material. The mold may then be unclamped and opened so that the pipe including the second material at the non-linear portion(s) can be removed.

In some examples, the second material may be formed at the same time as the first material, for example in a shared RTM or resin infusion process. In such examples, the fiber reinforcement of the first material may be formed by a first braided or woven preform, e.g. placed onto a suitable former or mandrel, and the carbon fiber reinforcement of the second material may be formed by a second braided or woven preform placed next to the first braided or woven preform. For example, the second braided or woven preform may be placed on top of or inside the first braided or woven preform. After arranging the first and second preforms in a suitable mold, a polymer matrix material e.g. epoxy resin is then added to form the first and second materials. The polymer matrix may be the same material throughout the composite pipe in such examples. Such manufacturing methods are further disclosed below.

In some examples, in addition or alternatively, the second material may be selectively added to the first material in a subsequent process step so as to be located at the non-linear portion(s) of the pipe.

In at least some examples, in addition or alternatively, the second material takes the form of a material layer selectively added at the at least one non-linear portion.

The arrangement of a first material extending end-to-end and a discontinuous second material, as disclosed herein, is ideal for forming complex pipe geometries including multiple bends. In at least some examples, the pipe includes a plurality of non-linear portions along the central axis between the first end and the second end, and the second material is arranged at each non-linear portion.

In at least some examples, the composite pipe is a fuel pipe.

There is further disclosed herein a method of making a fiber reinforced polymer composite pipe comprising: providing a mold cavity shaped to form a pipe having a first end, a second end, and at least one non-linear portion between the first end and the second end; placing one or more fiber preforms in the mold cavity to form the fiber reinforcement of a first material extending continuously from the first end to the second end; placing one or more carbon fiber preforms in the mold at the at least one non-linear portion to form the fiber reinforcement of a second material extending discontinuously between the first end and the second end; and filling the mold cavity with a polymer matrix material to form the first material as a fiber reinforced polymer material comprising fiber reinforcement in a polymer matrix and the second material as a carbon fiber reinforced polymer material comprising carbon fiber reinforcement in a polymer matrix.

Exemplary methods according to the present disclosure may take advantage of a shared RTM process, as described above, or any other suitable composites manufacturing process that enables fiber preforms to be impregnated by a polymer matrix material to make fiber reinforced polymer materials. Examples may include vacuum bagging or other resin infusion processes.

After the mold has been filled with the polymer matrix material, usually in liquid form, the polymer matrix material is left to solidify. The polymer matrix material may be thermoplastic or thermoset. In some examples, the polymer matrix material is a thermoset resin and the mold may optionally be heated to cure the resin.

In at least some examples of the disclosed method, the first material has an electrical resistivity determined by an electrically conductive fiber reinforcement and/or an electrically conductive additive in the polymer matrix, and the second material has an elastic modulus provided by the carbon fiber reinforcement, wherein the elastic modulus of the second material is greater than the elastic modulus of the first material in the longitudinal direction.

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

One or more non-limiting examples will now be described, by way of example only, and with reference to the accompanying figures, in which.

DETAILED DESCRIPTON

Figure 8A:
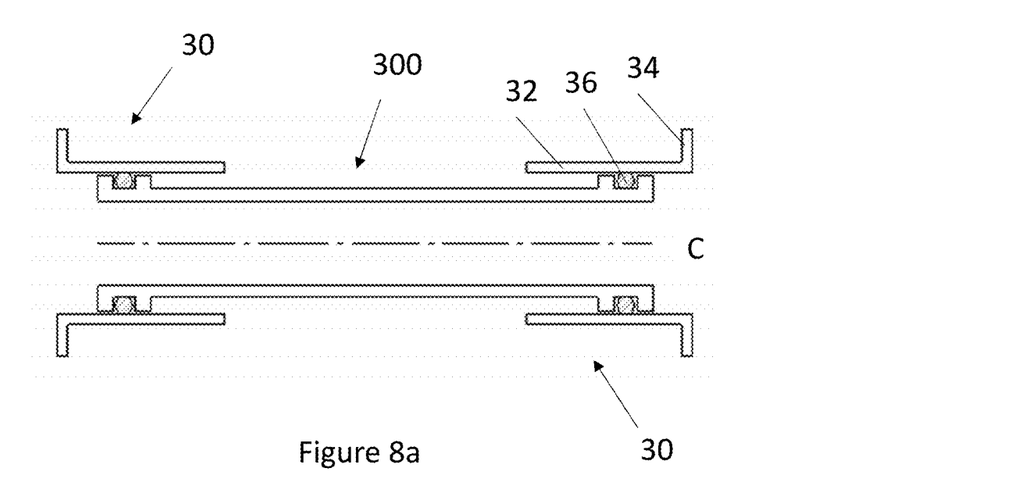
FIG. 8a is a schematic cross-sectional view of a composite pipe with end connectors as known in the prior art.
Figure 8B:
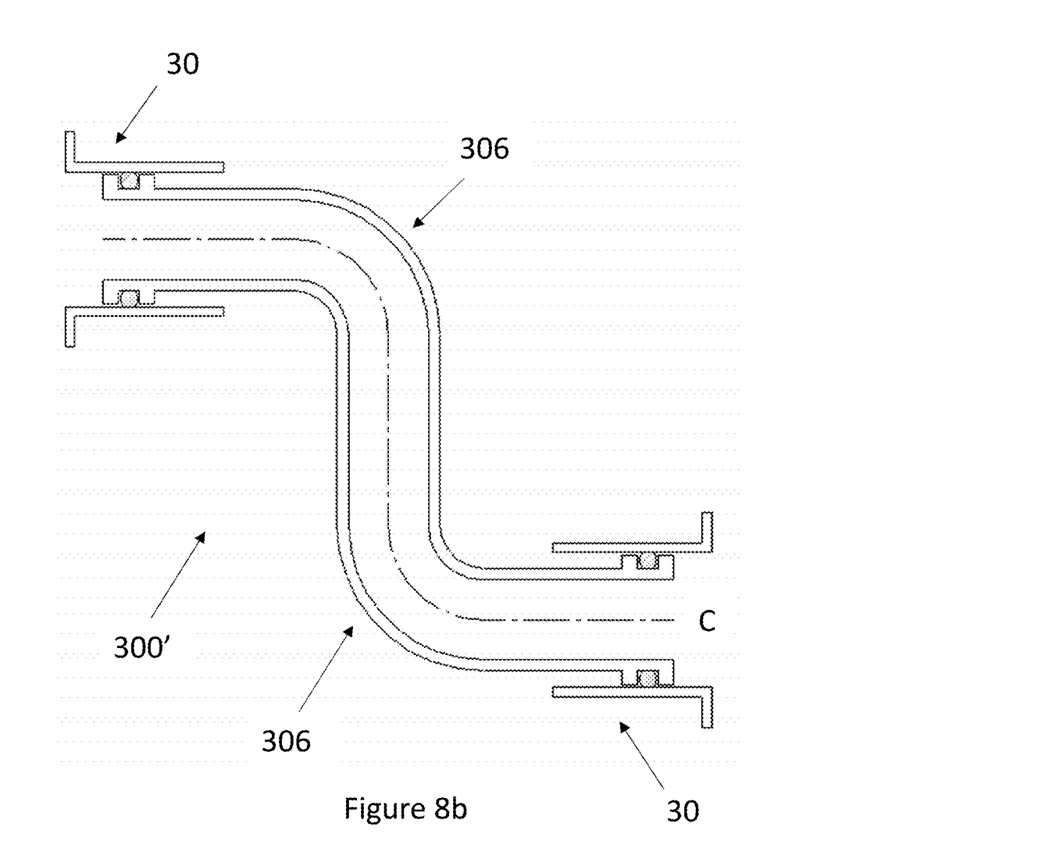
FIG. 8b is a schematic cross-sectional view of a composite pipe with end connectors according to one or more examples of the present disclosure.

In the first to sixth examples disclosed herein, there is seen a composite pipe that is hollow and may carry a pressurised fluid, for example in use as a fuel pipe. As is seen in FIGS. 8a and 8b, a composite fuel pipe is typically connected into the fuel system by floating seals at its first and second ends. This means that any axial displacement, resulting from bends in the pipe undergoing deformation as a result of the pressurised flow, can result in the pipe coming loose. It is therefore desirable to stiffen the non-linear portions of the pipe to prevent deformations.

Figure 1:
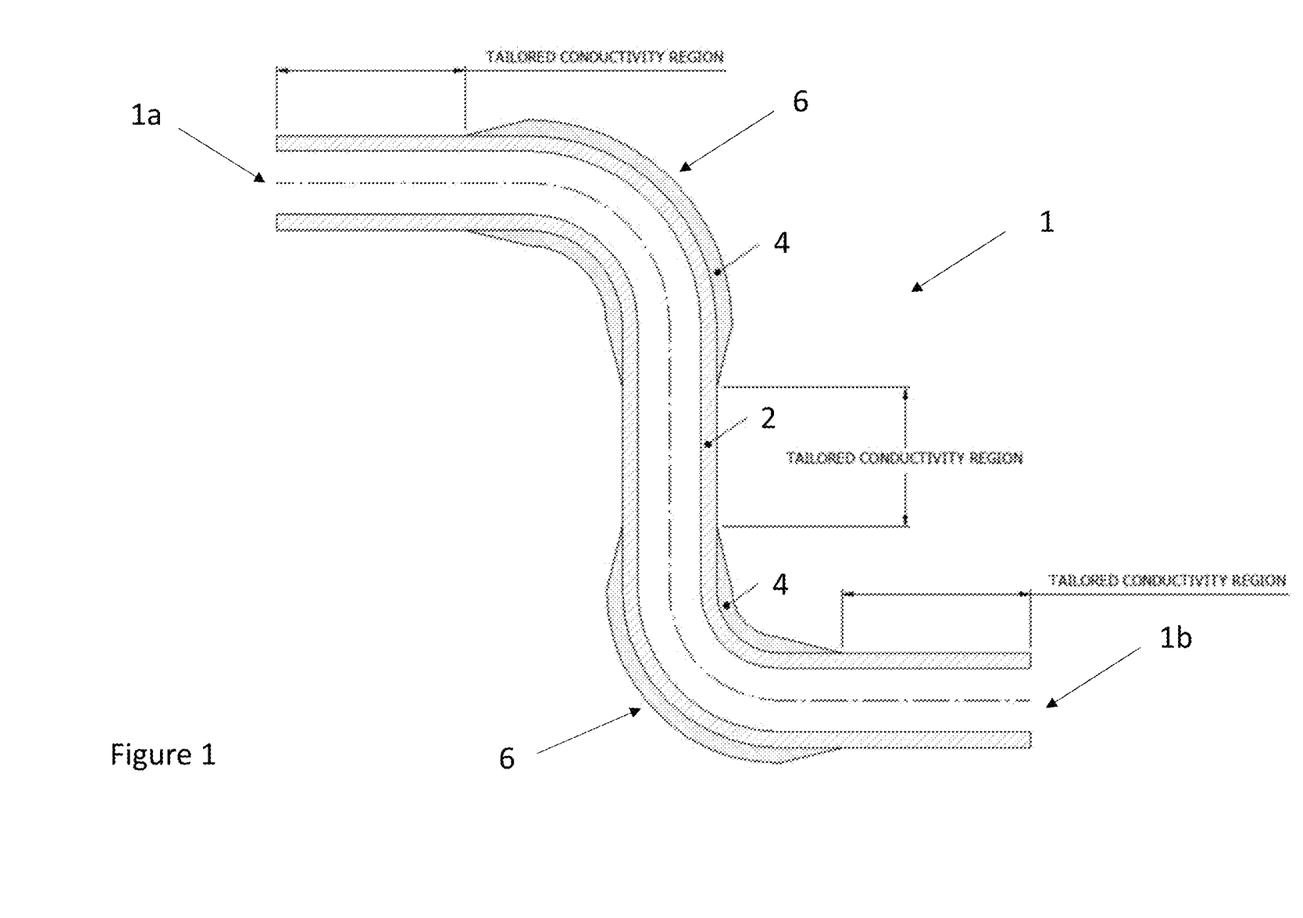
FIG. 1 is a schematic cross-sectional view of a composite pipe according to a first example.

In the first example seen in FIG. 1, a composite pipe 1 has a first end 1a and a second end 1b with a central axis (dashed line) running between the two ends 1a, 1b in a longitudinal direction. The pipe 1 is made of a first material 2 extending continuously from the first end 1a to the second end 1b. As disclosed herein, the first material 2 is a fiber reinforced polymer material having a predetermined electrical resistivity. The pipe 1 also includes a second material 4 arranged at the two non-linear portions 6. In this example, the second material 4 is localised at the two non-linear portions 6 and does not extend from the first end 1a to the second end 1b. As disclosed herein, the second material 4 is a carbon fiber reinforced polymer material having a greater elastic modulus than the first material 2 in the longitudinal direction. The second material 4 therefore provides additional axial stiffness/strength at the bends in the pipe 1.

Figure 2:
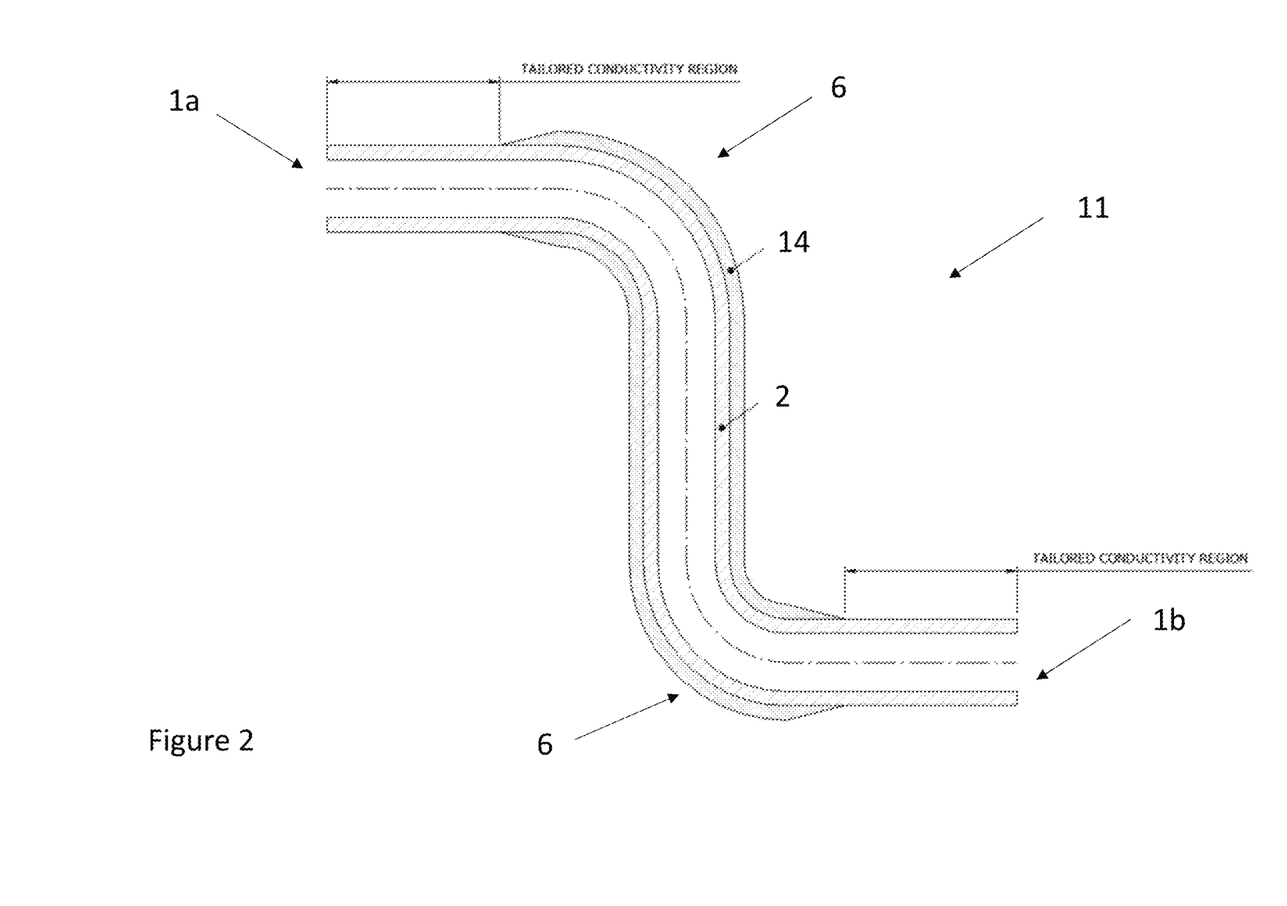
FIG. 2 is a schematic cross-sectional view of a composite pipe according to a second example.

In the second example seen in FIG. 2, the composite pipe 11 is again made of the first material 2 extending continuously from the first end 1a to the second end 1b. The second material 14 is arranged at the two non-linear portions 6 and extends between the two non-linear portions 6, but does not extend continuously from the first end 1a to the second end 1b.

Figure 3:
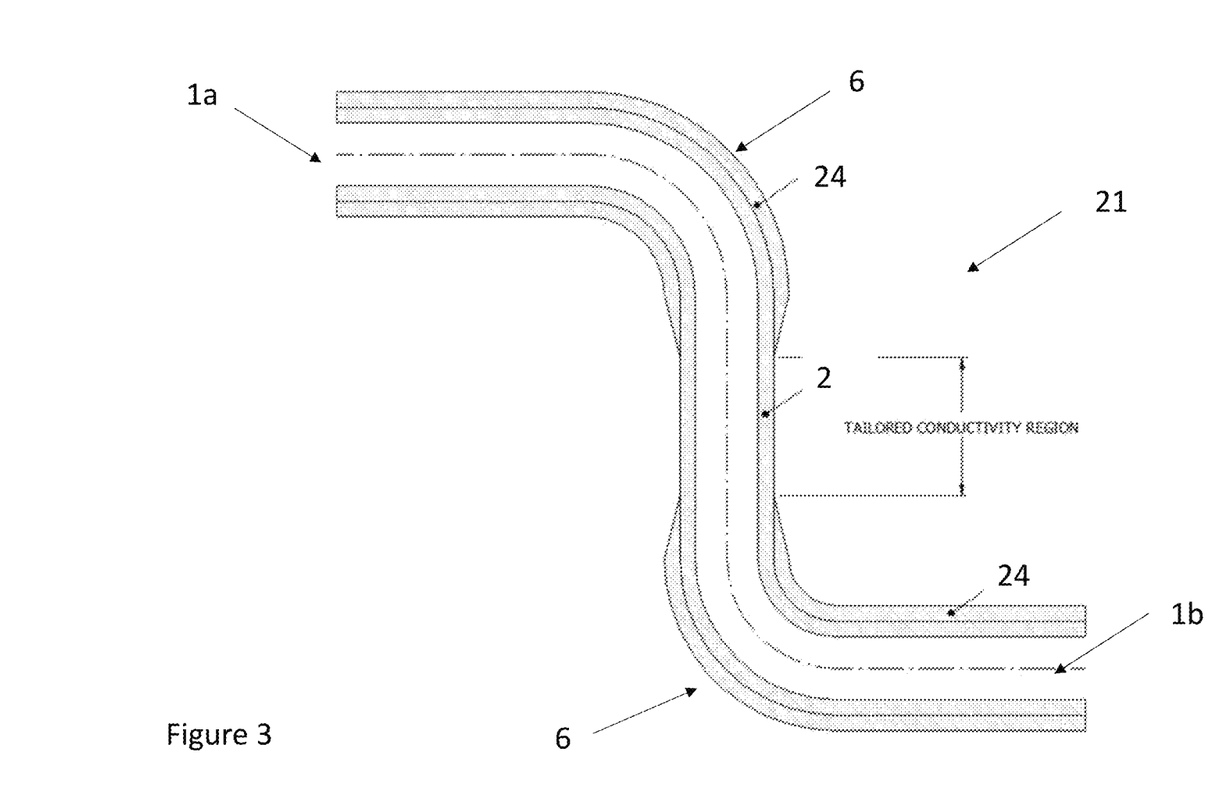
FIG. 3 is a schematic cross-sectional view of a composite pipe according to a third example.

In the third example seen in FIG. 3, the composite pipe 21 is again made of the first material 2 extending continuously from the first end 1a to the second end 1b. The second material 24 is arranged at the two non-linear portions 6 and extends from each non-linear portion 6 to the nearest end 1a, 1b, but does not extend continuously from the first end 1a to the second end 1b.

In the examples of FIGS. 1-3, the second material 4 is formed as a layer on the outside of the first material 2. The first material 2 forms an inner pipe.

In the following examples of FIGS. 4-6, the second material is formed as a layer on the inside of the first material. The first material forms an outer pipe.

Figure 4:
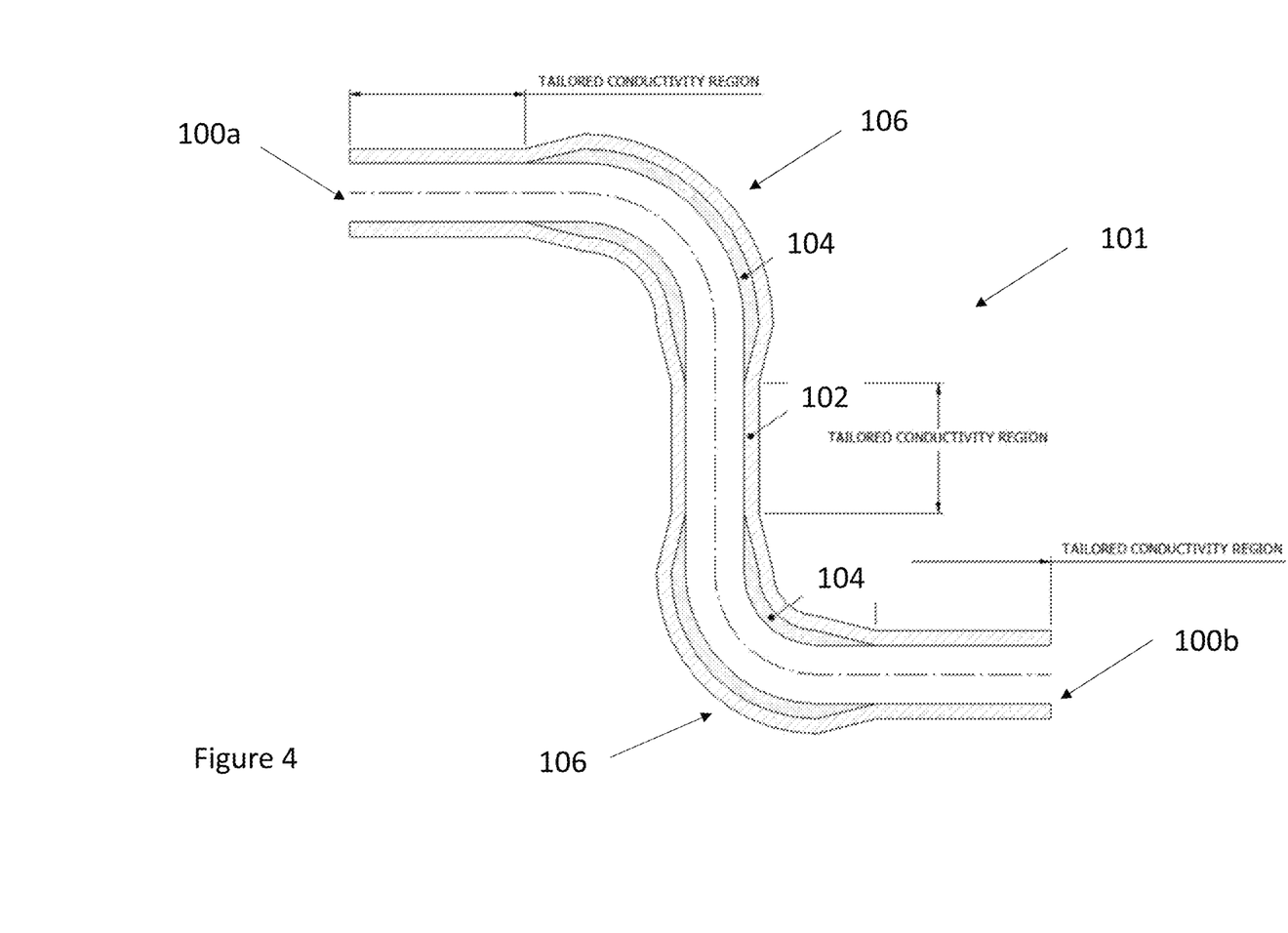
FIG. 4 is a schematic cross-sectional view of a composite pipe according to a fourth example.

In the fourth example seen in FIG. 4, a composite pipe 100 has a first end 100a and a second end 100b with a central axis (dashed line) running between the two ends 100a, 100b in a longitudinal direction. The pipe 100 is made of a first material 102 extending continuously from the first end 100a to the second end 100b. As disclosed herein, the first material 102 is a fiber reinforced polymer material having a predetermined electrical resistivity. The pipe 100 also includes a second material 104 arranged at the two non-linear portions 106. In this example, the second material 104 is localised at the two non-linear portions 106 and does not extend continuously from the first end 100a to the second end 100b. As disclosed herein, the second material 104 is a carbon fiber reinforced polymer material having a greater elastic modulus than the first material 102 in the longitudinal direction. The second material 104 therefore provides additional stiffness/strength at the bends in the pipe 100.

Figure 5:
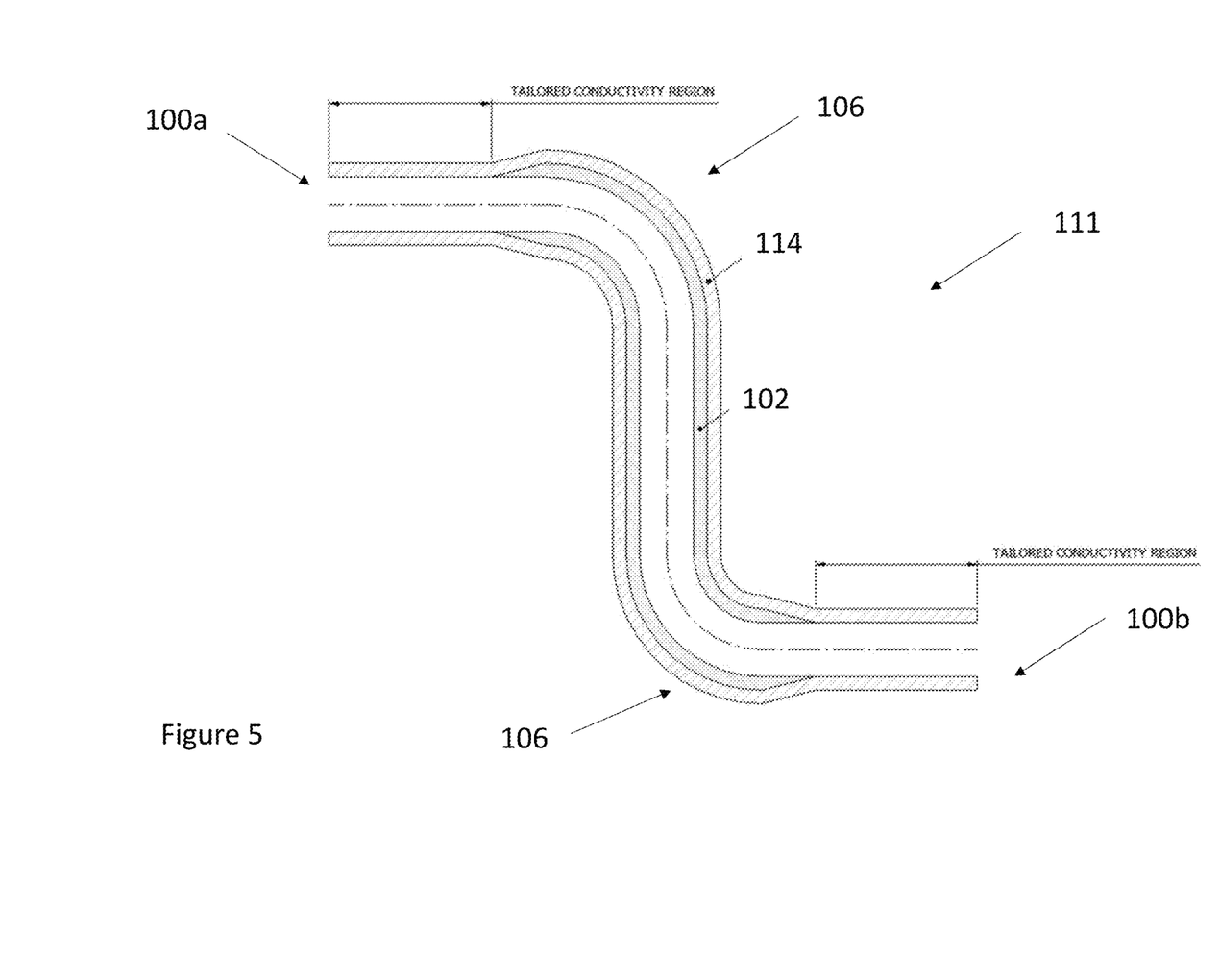
FIG. 5 is a schematic cross-sectional view of a composite pipe according to a fifth example.

In the fifth example seen in FIG. 5, the composite pipe 111 is again made of the first material 102 extending continuously from the first end 100a to the second end 100b. The second material 114 is arranged at the two non-linear portions 106 and extends between the two non-linear portions 106, but does not extend continuously from the first end 100a to the second end 100b.

Figure 6:
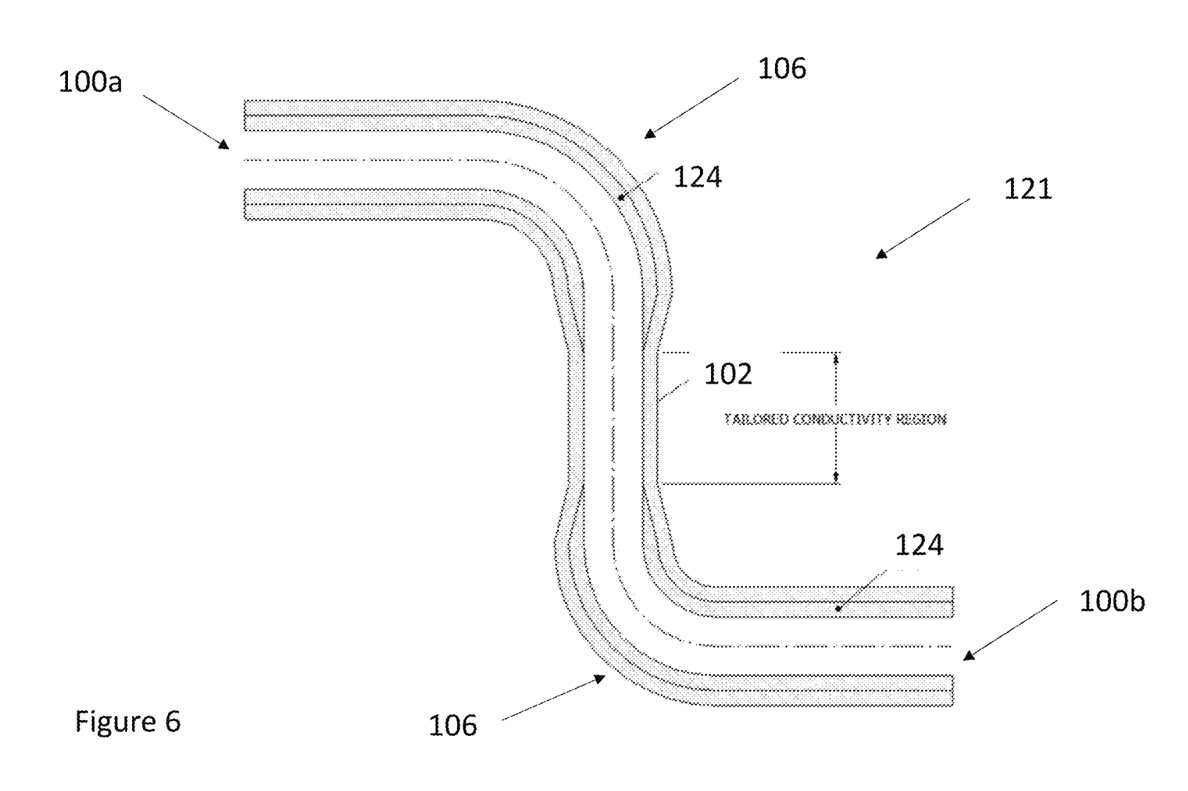
FIG. 6 is a schematic cross-sectional view of a composite pipe according to a sixth example.

In the sixth example seen in FIG. 6, the composite pipe 121 is again made of the first material 102 extending continuously from the first end 100a to the second end 100b. The second material 124 is arranged at the two non-linear portions 106 and extends from each non-linear portion 106 to the nearest end 100a, 100b, but does not extend continuously from the first end 100a to the second end 100b.

In the examples seen in FIGS. 1-6, the linear portions of the pipes, i.e. those portions that are not the non-linear portions 6, 106, are referred to as "tailored conductivity regions" because only the first material is present. As is disclosed herein, the first material 2, 102 has an electrical resistivity determined by an electrically conductive fiber reinforcement and/or an electrically conductive additive in the polymer matrix, and this electrical resistivity can be tailored so as to achieve a desired overall resistance per unit length for the composite pipe.

In the examples illustrated herein, the pipes 1, 11, 21, 100, 111, 121 are not linear and instead have a more complex shape, shown as including two bends or non-linear portions 6, 106. However, it will be appreciated that the present disclosure can be applied to complex pipe shapes includes any number of bends.

Figure 7:
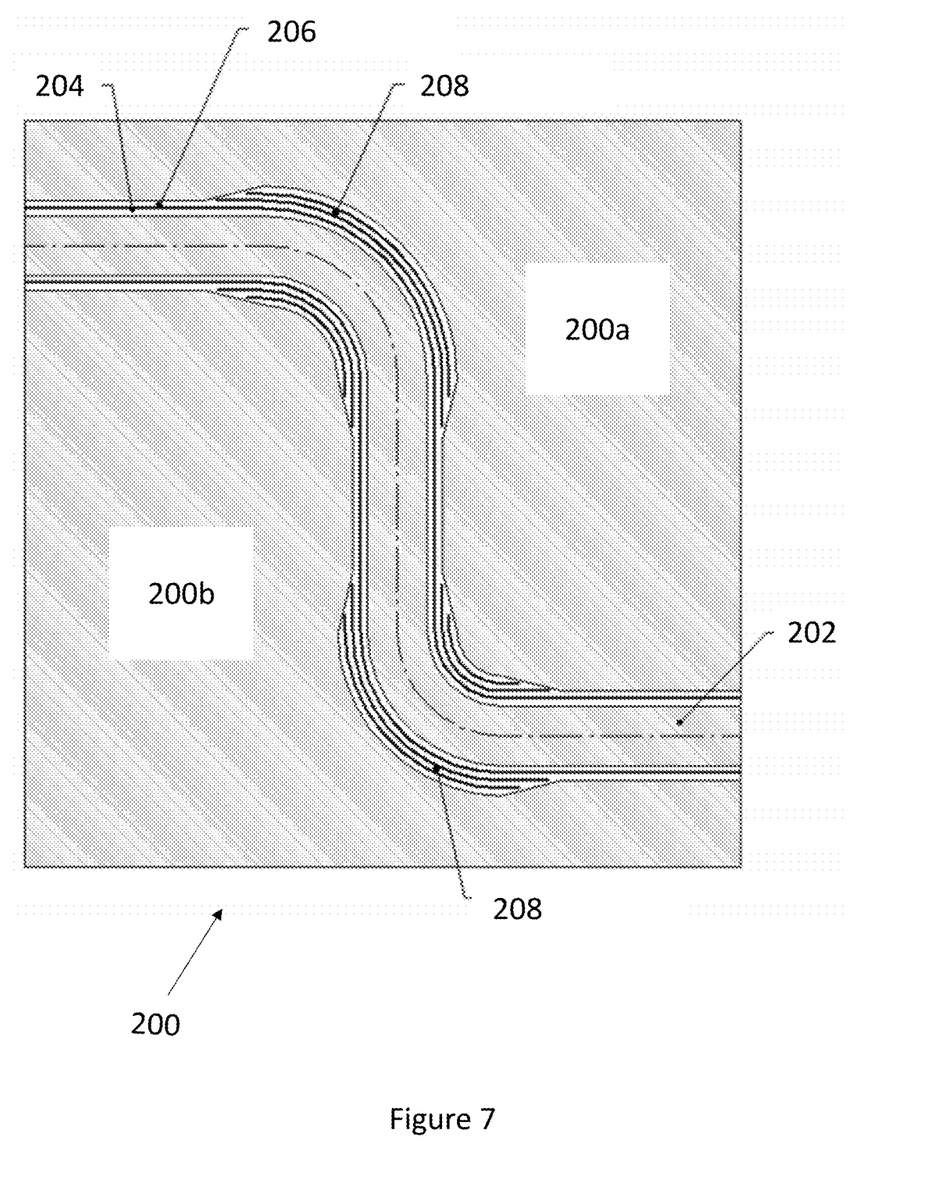
FIG. 7 is a schematic cross-sectional view of a mold used in an exemplary method of making a composite pipe.

FIG. 7 schematically illustrates an exemplary manufacturing process for a pipe 1 such as that seen in FIG. 1. In a Resin Transfer Molding (RTM) process, a two-part mold 200a, 200b includes a core 202 and a molding cavity 204. In this example, one or more fiber preforms 206 for the first material are placed over the core 202 in the cavity 204 so as to create a material layer extending continuously from one end of the core 202 to the other end. One or more carbon fiber preforms 208 for the second material are placed in the cavity 204 at the non-linear portions i.e. bends. The two parts 200a, 200b of the mold are then clamped shut and a vacuum is applied while a resin such as epoxy resin is injected under pressure into the cavity 204. The combination of injection under pressure and the applied vacuum should draw the resin through the fiber preforms 206, 208. Heat is then applied to the mold 200 to cure the resin. This causes the fiber reinforcement and the resin to set in the form of a solid fiber-reinforced composite pipe. The mold 200 may then be unclamped and opened so that the pipe including the second material at the non-linear portion(s) can be removed. In this example, a single shared RTM process is used to form the pipe 1.

There is seen in FIG. 8a a schematic cross-sectional view of a straight composite pipe 300 with end connectors 30 as known in the prior art. The connectors 30 each comprise a cylindrical hub 32, extending parallel to the central axis C of the pipe 300, and a flange 34, which extends in a direction perpendicular to the central axis C. The flange 34 may be used to secure the connector 30 to another structure, e.g. an aircraft wing.

Where the hub 32 encircles the pipe 300, an elastomeric O-ring 36 is located between the hub 32 and the pipe 300, retained between an inner wall of the hub 32 and an outer wall of the pipe 300. The O-ring 36 is confined between a pair of retaining ridges 38 which extend radially outwards from the pipe 300 at its ends. The O-ring 36 provides a seal between the connector 30 and the pipe 300, such that fluid may flow along the pipe 300 and into the connector 30 without escaping. In addition, the configuration of the O-ring 36 allows the pipe 300 to move a small distance in the longitudinal direction of the central axis C relative to the connectors 30 without compromising the seal. This enables a structure to which the connector 30 is secured to move or flex a small amount without imparting large stresses on the pipe 300 (as would be the case if the connector 30 were rigidly attached to the pipe 300). Instead, the pipe 300 "floats" on the O-ring 36 such that it can slide longitudinally a small distance without breaking the seal. For example, the structure to which the connector 30 is attached may be an aircraft wing spar, which is designed to move a small amount during flight as the wing flexes due to aerodynamic load and/or temperature fluctuations. The pipe 300 may comprise a fuel pipe located within the wing which must therefore be able to cope with wing flex during flight.

There is seen in FIG. 8b a schematic cross-sectional view of a complex-shaped composite pipe 300' with the same standard end connectors 30. The more complex geometry of the pipe 300' introduces extra demands as there may be a tendency for the pipe 300' to deform at its non-linear portions (i.e. bends) 306. Deflections in the composite pipe 300' can cause the ends of the pipe 300' to move larger distances in the longitudinal direction of the central axis C relative to the connectors 30, causing the pipe 300' to come loose from its end connectors 30. However, this problem is addressed by using a composite pipe that has its non-linear portions strengthened by a second material according to any of the examples disclosed herein.

Although the present disclosure has been described with reference to various examples, it will be understood by those skilled in the art that various changes in form and detail may be made without departing from the scope of the disclosure as set forth in the accompanying claims.

What is claimed is:

1. A fiber reinforced polymer composite pipe comprising:
a first end;
a second end;
wherein the pipe defines a central axis running in a longitudinal direction from the first end to the second end, and the pipe including at least one non-linear portion along the central axis between the first end and the second end;
a first material extending continuously from the first end to the second end, the first material being a fiber reinforced polymer material comprising fiber reinforcement in a polymer matrix and having an electrical resistivity determined by an electrically conductive fiber reinforcement and/or an electrically conductive additive in the polymer matrix; and
a second material arranged at the at least one non-linear portion and extending discontinuously between the first end and the second end, the second material being a carbon fiber reinforced polymer material comprising carbon fiber reinforcement in a polymer matrix and having an elastic modulus provided by the carbon fiber reinforcement,
wherein the elastic modulus of the second material is greater than the elastic modulus of the first material in the longitudinal direction.

2. The composite pipe according to claim 1, wherein the first material is a fiber reinforced polymer material comprising an electrically non-conductive fiber reinforcement in the polymer matrix, and having an electrical resistivity at least partially determined by an electrically conductive additive in the polymer matrix.

3. The composite pipe according to claim 2, wherein the electrically conductive additive is chosen from one or more of: carbon black, graphene, carbon nanotubes, and conductive metal oxide particles.

4. The composite pipe according to claim 2, wherein the electrically conductive additive is present in the polymer matrix in an amount is between 0.5% and 40% of the polymer matrix by weight or volume.

5. The composite pipe according to claim 1, wherein the first material is a fiber reinforced polymer material comprising chopped carbon fiber reinforcement in the polymer matrix, and having an electrical resistivity at least partially determined by the chopped carbon fiber reinforcement.

6. The composite pipe according to claim 1, wherein:
the first material has an electrical resistivity selected such that the composite pipe has an overall resistance per unit length of between 50 kΩ per meter and 4 MΩ per meter, or
the first material has an electrical resistivity selected such that the composite pipe has an overall resistance per unit length of less than 1.25 MΩ per meter.

7. The composite pipe according to claim 1, wherein the first material takes the form of an inner pipe or an outer pipe.

8. The composite pipe according to claim 1, wherein the second material is a carbon fiber reinforced polymer material comprising continuous carbon fiber reinforcement in a polymer matrix.

9. The composite pipe according to claim 8, wherein at least some of the continuous carbon fiber reinforcement extends at an angle of between −30 degrees and +30 degrees relative to the central axis of the pipe.

10. The composite pipe according to claim 8, wherein the continuous carbon fiber reinforcement is formed by a tri-axially braided tube comprising a first group of continuous carbon fibers extending substantially along the central axis of the pipe, a second group of continuous carbon fibers extending at an angle of +50-85 degrees relative to the central axis of the pipe, and a third group of continuous carbon fibers extending at an angle of −50-85 degrees relative to the central axis of the pipe.

11. The composite pipe according to claim 8, wherein at least some of the continuous carbon fiber reinforcement extends at an angle of between −5 degrees and +5 degrees relative to the central axis of the pipe.

12. The composite pipe according to claim 1, wherein the first material and/or the second material is formed by resin transfer molding (RTM).

13. The composite pipe according to claim 1, wherein the first material and/or the second material is formed by automated fiber placement (AFP).

14. The composite pipe according to claim 1, wherein the second material takes the form of a material layer selectively added at the at least one non-linear portion.

15. The composite pipe according to claim 1, wherein the pipe includes a plurality of non-linear portions along the central axis between the first end and the second end, and the second material is arranged at each non-linear portion.

* * * * *